(12) United States Patent
Kikuchi

(10) Patent No.: US 8,594,055 B2
(45) Date of Patent: Nov. 26, 2013

(54) WIRELESS COMMUNICATION SYSTEM, BASE STATION, SCHEDULING METHOD, AND PROGRAM

(75) Inventor: Tooru Kikuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 663 days.

(21) Appl. No.: 12/481,051

(22) Filed: Jun. 9, 2009

(65) Prior Publication Data

US 2009/0303970 A1 Dec. 10, 2009

(30) Foreign Application Priority Data

Jun. 9, 2008 (JP) ................................ 2008-150518

(51) Int. Cl.
*H04J 3/00* (2006.01)
*H04L 12/28* (2006.01)
*H04L 12/56* (2011.01)

(52) U.S. Cl.
USPC .................... 370/336; 370/394.4; 370/395.41; 370/395.42

(58) Field of Classification Search
USPC ...................... 370/336, 395.4, 395.41, 395.42
See application file for complete search history.

(56) References Cited

U.S. PATENT DOCUMENTS

| 5,751,708 | A  | * | 5/1998 | Eng et al. ................. 370/395.42 |
| 7,149,204 | B2 | * | 12/2006 | Shoji et al. .................... 370/337 |
| 2007/0140165 | A1 | | 6/2007 | Kim et al. |
| 2007/0201397 | A1 | * | 8/2007 | Zhang .......................... 370/329 |
| 2008/0004058 | A1 | * | 1/2008 | Jeong et al. ................... 455/517 |
| 2008/0080423 | A1 | | 4/2008 | Kolding et al. |
| 2009/0010202 | A1 | * | 1/2009 | Masayuki et al. ............ 370/328 |
| 2009/0080369 | A1 | * | 3/2009 | Uminski et al. .............. 370/328 |
| 2009/0316811 | A1 | * | 12/2009 | Maeda et al. ................. 375/260 |
| 2010/0113057 | A1 | * | 5/2010 | Englund et al. ............ 455/452.1 |
| 2010/0234033 | A1 | * | 9/2010 | Iwamura ....................... 455/450 |
| 2010/0255850 | A1 | * | 10/2010 | Kaukoranta et al. .......... 455/450 |
| 2011/0038341 | A1 | * | 2/2011 | Norlund et al. ............... 370/329 |
| 2011/0044192 | A1 | * | 2/2011 | Wang et al. ................... 370/252 |

FOREIGN PATENT DOCUMENTS

| JP | 2003521138 | A | 7/2003 |
| JP | 2003273880 | A | 9/2003 |
| JP | 3566660 | B | 6/2004 |
| JP | 2007266753 | A | 10/2007 |
| WO | 2006126920 | A | 11/2006 |

OTHER PUBLICATIONS

European Search Report for EP 09 00 7566 completed Sep. 23, 2009.
H. Inamura et al., "TCP over Second (2.5G) and Third (3G) Generation Wireless Networks", Network Working Group, RFC3481, Feb. 2003.
Japanese Office Action for JP2008-150518 mailed on Oct. 30, 2012.

* cited by examiner

*Primary Examiner* — Farah Faroul

(57) ABSTRACT

A wireless communication system comprising: a holding unit that holds at least wireless resource allocation information on an opposite-direction communication link for use as information for deciding priority of wireless resource allocation to mobile stations, said opposite-direction communication link being a communication link in a direction opposite to a direction in which allocation priority is to be decided; and a scheduling unit that performs scheduling to allocate wireless resources with priority given to mobile stations, to which wireless resources are allocated on the opposite-direction communication link, using the wireless resource allocation information on the opposite-direction communication link.

20 Claims, 11 Drawing Sheets

FIG. 2

| | | UPLINK MANAGEMENT INFORMATION | | |
|---|---|---|---|---|
| MOBILE STATION 1 | UPLINK RECEPTION QUALITY 1 | UPLINK QoS1 | PRESENCE/ABSENCE OF UPLINK TRANSMISSION REQUEST 1 | DOWNLINK ALLOCATION INFORMATION 1 |
| MOBILE STATION 2 | UPLINK RECEPTION QUALITY 2 | UPLINK QoS2 | PRESENCE/ABSENCE OF UPLINK TRANSMISSION REQUEST 2 | DOWNLINK ALLOCATION INFORMATION 2 |
| . . . | . . . | . . . | . . . | . . . |
| MOBILE STATION N | UPLINK RECEPTION QUALITY N | UPLINK QoSN | PRESENCE/ABSENCE OF UPLINK TRANSMISSION REQUEST 3 | DOWNLINK ALLOCATION INFORMATION N |

FIG. 3

| | DOWNLINK MANAGEMENT INFORMATION | | | |
|---|---|---|---|---|
| | DOWNLINK RECEPTION QUALITY 1 | DOWNLINK QoS1 | PRESENCE/ABSENCE OF DOWNLINK TRANSMISSION DATA 1 | UPLINK ALLOCATION INFORMATION 1 |
| MOBILE STATION 1 | DOWNLINK RECEPTION QUALITY 2 | DOWNLINK QoS2 | PRESENCE/ABSENCE OF DOWNLINK TRANSMISSION DATA 2 | UPLINK ALLOCATION INFORMATION 2 |
| MOBILE STATION 2 | . . | . | . | . |
| . . | DOWNLINK RECEPTION QUALITY N | DOWNLINK QoSN | PRESENCE/ABSENCE OF DOWNLINK TRANSMISSION DATA 3 | UPLINK ALLOCATION INFORMATION N |
| MOBILE STATION N | | | | |

FIG. 10 RELATED ART

| | UPLINK MANAGEMENT INFORMATION | |
|---|---|---|
| MOBILE STATION 1 | UPLINK RECEPTION QUALITY 1 | UPLINK QoS1 | PRESENCE/ABSENCE OF UPLINK TRANSMISSION REQUEST 1 |
| MOBILE STATION 2 | UPLINK RECEPTION QUALITY 2 | UPLINK QoS2 | PRESENCE/ABSENCE OF UPLINK TRANSMISSION REQUEST 2 |
| . | . | . | . |
| MOBILE STATION N | UPLINK RECEPTION QUALITY N | UPLINK QoSN | PRESENCE/ABSENCE OF UPLINK TRANSMISSION REQUEST 3 |

FIG. 11 RELATED ART

| | DOWNLINK MANAGEMENT INFORMATION | | |
|---|---|---|---|
| MOBILE STATION 1 | DOWNLINK RECEPTION QUALITY 1 | DOWNLINK QoS1 | PRESENCE/ABSENCE OF DOWNLINK TRANSMISSION REQUEST 1 |
| MOBILE STATION 2 | DOWNLINK RECEPTION QUALITY 2 | DOWNLINK QoS2 | PRESENCE/ABSENCE OF DOWNLINK TRANSMISSION REQUEST 2 |
| . | . | . | . |
| MOBILE STATION N | DOWNLINK RECEPTION QUALITY N | DOWNLINK QoSN | PRESENCE/ABSENCE OF DOWNLINK TRANSMISSION REQUEST 3 |

WIRELESS COMMUNICATION SYSTEM, BASE STATION, SCHEDULING METHOD, AND PROGRAM

REFERENCE TO RELATED APPLICATION

This application is based upon and claims the benefit of the priority of Japanese patent application No. 2008-150518, filed on Jun. 9, 2008, the disclosure of which is incorporated herein in its entirety by reference thereto.

TECHNICAL FIELD

The present invention relates to a wireless communication system, a base station, a scheduling method, and a program and more particularly to a wireless communication system, a base station, a scheduling method, and a program that provide a scheduling method allowing multiple mobile stations to share uplink and downlink wireless resources.

BACKGROUND

For use in wireless resource allocation (scheduling) to mobile stations in a wireless communication system, a method is known that is based on the reception quality of mobile stations or on Quality of Service (QoS).

For example, in the uplink communication (from mobile station to base station), the base station uses the information on the mobile stations on the uplink (uplink reception quality, uplink QoS, presence or absence of uplink transmission request) shown in FIG. 10, which is stored in each mobile station, to calculate the priority of the mobile stations for scheduling. Similarly, in the downlink communication (from base station to mobile station), the base station uses the information on the mobile stations on the downlink (downlink reception quality, QoS, presence or absence of downlink transmission data) shown in FIG. 11 to calculate the priority of the mobile stations for scheduling.

Another scheduling method is also known that assures the user of a predetermined communication quality. For example, Patent Document 1 discloses a scheduling method in the minimum-guaranteed best effort mode based on the priority management table describing the priority of the mobile stations.

Patent Document 2 discloses a two-way wireless packet communication device that determines the number of uplink and downlink data transmissions for each wireless terminal (mobile station) from the ratio between the downlink quality-guaranteed data amount and the uplink quality-guaranteed data amount and, based on the ratio between the downlink and uplink quality-guaranteed data amounts and on the priority of uplink quality-guaranteed data, creates an uplink scheduling list.

Patent Document 3 discloses a wireless packet communication system that schedules wireless resources based on the advanced reservation algorithm that determines if the IP flow is jitter-sensitive.

W-TCP (Wireless Profiled Transmission Control Protocol) is standardized in RFC3481 as a reliable data transfer protocol for mobile communication systems (Non-Patent Document 1). TCP is designed for a relatively stable communication environment, while W-TCP is optimized for a mobile communication system in which communication path disconnections or packet losses may occur frequently.

PATENT DOCUMENT 1

Japanese Patent Kokai Publication No. JP-P2003-273880A

PATENT DOCUMENT 2

Japanese Patent No. 3566660

PATENT DOCUMENT 3

Japanese Patent Kohyo Publication No. JP-P2003-521138A

NON-PATENT DOCUMENT 1

H. Inamura et al., "TCP over Second (2.5G) and Third (3G) Generation Wireless Networks", http://www.ietf.org/rfc/rfc3481.txt?number=3481

SUMMARY

The entire disclosures of Patent Documents 1 to 3 and Non-Patent Document 1 are incorporated herein by reference thereto.

In a wireless packet communication system where multiple mobile stations, connected to a base station, share uplink and downlink wireless resources for packet communication, there are sometimes too many mobile stations and, in addition, the reception quality of the mobile stations differ between the transmission and the reception. In such a situation, because the uplink communication and the downlink communication are scheduled independently in the method described above, a situation may occur in which, when data is transmitted from one side, the wireless resources for a response from the other side cannot be allocated. In this case, a response to a transmission from one side is delayed even under the protocol, such as W-TCP, designed specifically for wireless communication, with the result that the throughput is decreased by retransmissions.

To solve this problem, priority is given to high-priority users (mobile stations) in the method disclosed in Patent Documents 1 and 2. In this method, however, delays in the processing for low-priority users (users in a service class for which quality is not guaranteed) will increase.

The method disclosed in Patent Document 3 is that, in addition to the control in Patent Documents 1 and 2 in which high priority is given to high-priority users (mobile stations), highest priority is given to the UDP data flow that does not require retransmission control but requires real-time processing ability.

In view of the foregoing, it is an object of the present invention to provide a wireless communication system, a base station, a scheduling method, and a program that can improve a throughput decrease caused by a response delay when a connection type communication such as TCP and W-TCP is used.

According to a first aspect of the present invention, there is provided a wireless communication system comprising a holding unit that holds at least wireless resource allocation information on an opposite-direction communication link for use as information for deciding priority of wireless resource allocation to mobile stations, the opposite-direction communication link being a communication link in a direction opposite to a direction in which allocation priority is to be decided; and a scheduling unit that performs scheduling to allocate wireless resources with priority, higher than that of other mobile stations, given to mobile stations, to which wireless resources are allocated on the opposite-direction communication link, using the wireless resource allocation information on the opposite-direction communication link.

According to a second aspect of the present invention, there is provided a base station comprising a holding unit that holds at least wireless resource allocation information on an opposite-direction communication link for use as information for deciding priority of wireless resource allocation to mobile stations, the opposite-direction communication link being a communication link in a direction opposite to a direction in which allocation priority is to be decided; and a scheduling unit that performs scheduling to allocate wireless resources with priority, higher than that of other mobile stations, given to mobile stations, to which wireless resources are allocated on the opposite-direction communication link, using the wireless resource allocation information on the opposite-direction communication link.

According to a third aspect of the present invention, there is provided a scheduling method comprising the steps of holding at least wireless resource allocation information on an opposite-direction communication link for use as information for deciding priority of wireless resource allocation to mobile stations, the opposite-direction communication link being a communication link in a direction opposite to a direction in which allocation priority is to be decided; and performing scheduling to allocate wireless resources with priority, higher than that of other mobile stations, given to mobile stations, to which wireless resources are allocated on the opposite-direction communication link, using the wireless resource allocation information on the opposite-direction communication link.

According to a fourth aspect of the present invention, there is provided a program causing a computer included in a base station of a wireless communication system to execute processing of holding at least wireless resource allocation information on an opposite-direction communication link for use as information for deciding priority of wireless resource allocation to mobile stations, the opposite-direction communication link being a communication link in a direction opposite to a direction in which allocation priority is to be decided; and processing of performing scheduling to allocate wireless resources with priority, higher than that of other mobile stations, given to mobile stations, to which wireless resources are allocated on the opposite-direction communication link, using the wireless resource allocation information on the opposite-direction communication link.

The meritorious effects of the present invention are summarized as follows.

According to the present invention, a throughput decrease can be avoided even when many mobile stations are connected to a base station or the reception quality differs between the transmission and the reception. The reason is that wireless resource scheduling is performed considering whether or not wireless resources are allocated to a transmission on the communication link in the opposite direction, that is, whether or not the transmission is a response in the connection type communication.

BRIEF DESCRIPTION OF THE DRAWINGS

FIG. 2 is a diagram showing, in the tabular format, the information (uplink) on the mobile stations managed by a base station in the wireless communication system in the first exemplary embodiment of the present invention.

FIG. 3 is a diagram showing, in the tabular format, the information (downlink) on the mobile stations managed by a base station in the wireless communication system in the first exemplary embodiment of the present invention.

FIG. 10 is a diagram showing, in the tabular format, the information (uplink) on the mobile stations managed by a base station of a wireless communication system described in the background art.

FIG. 11 is a diagram showing, in the tabular format, the information (downlink) on the mobile stations managed by a base station of the wireless communication system described in the background art.

PREFERRED EXEMPLARY EMBODIMENTS

Next, preferred exemplary embodiments of the present invention will be described in detail with reference to the drawings.

First Exemplary Embodiment

Figure 1:
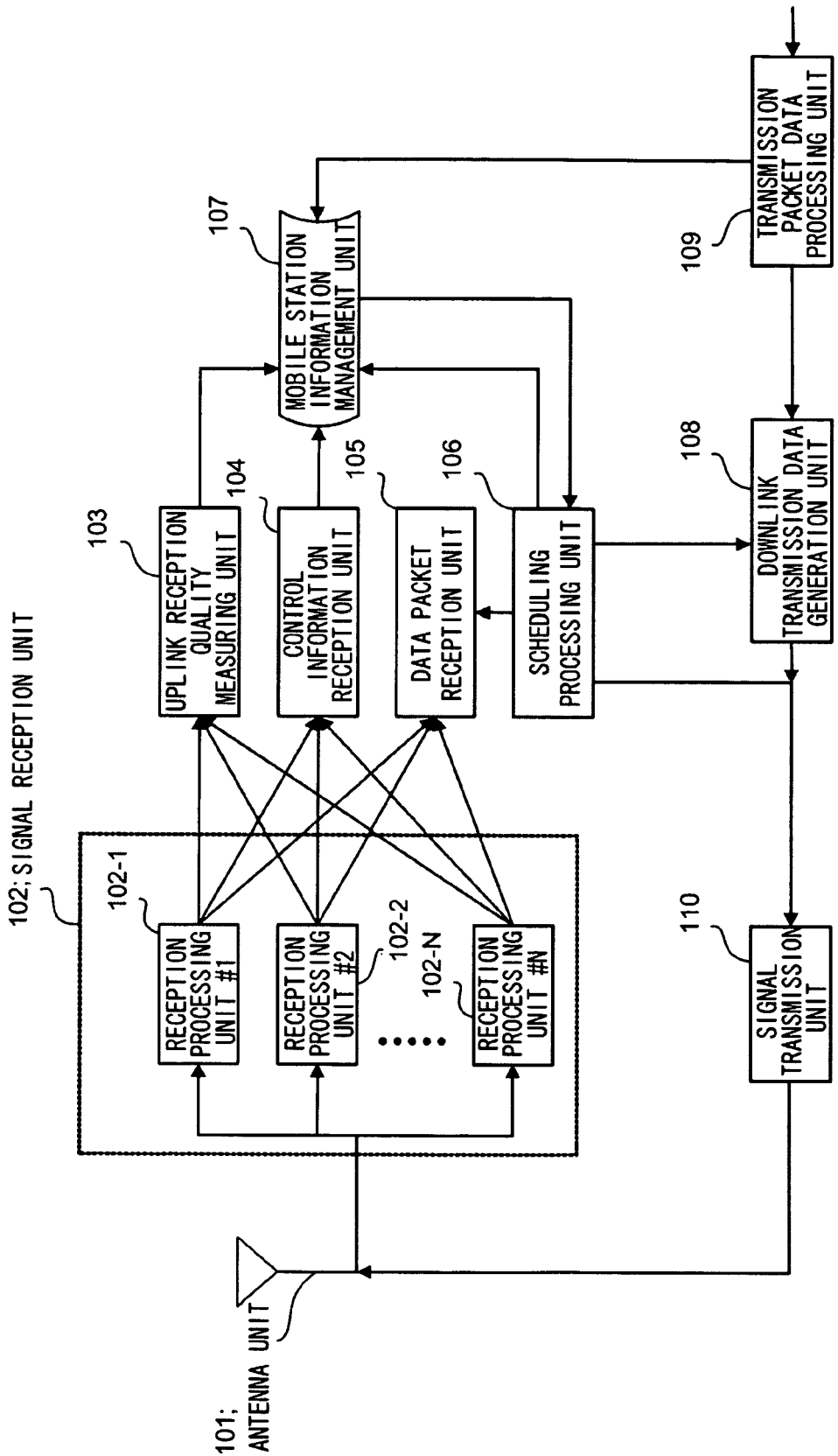
FIG. 1 is a block diagram showing the configuration of a base station in a wireless communication system in a first exemplary embodiment of the present invention.

FIG. 1 is a block diagram showing the configuration of a base station in a wireless communication system in a first exemplary embodiment of the present invention.

FIG. 1 shows a base station comprising an antenna unit 101, a signal reception unit 102, an uplink reception quality measuring unit 103, a control information reception unit 104, a data packet reception unit 105, a scheduling processing unit 106, a mobile station information management unit 107, a downlink transmission data generation unit 108, a transmission packet data processing unit 109, and a signal transmission unit 110.

The signal reception unit 102 comprises N reception processing units 102-1-102-N (N is a positive integer), one for each mobile station. The reception processing units 102-1-102-N separate uplink signals from mobile stations, received via the antenna unit 101, into the reception signal for each of the mobile stations, convert each signal to the baseband signal, and output the converted signal to the uplink reception quality measuring unit 103, control information reception unit 104, and data packet reception unit 105.

The uplink reception quality measuring unit 103 measures the uplink reception signal quality for each mobile station based on the received reception signal, and outputs the measured result to the mobile station information management unit 107.

The control information reception unit 104 extracts the downlink reception signal quality, QoS, and uplink data transmission request from the received signal and outputs them to the mobile station information management unit 107.

The data packet reception unit 105 receives uplink data packets from a mobile station to which the transmission permission is notified.

The mobile station information management unit 107, which acts as means that holds at least the allocation information on a communication link in the direction opposite to the direction in which the allocation priority is to be decided, outputs the information on the managed mobile stations to the scheduling processing unit 106.

FIG. 2 is a diagram showing, in the tabular format, the uplink information on the mobile stations managed by the mobile station information management unit 107. This table is different from the table shown in FIG. 10 in that the downlink allocation information on the mobile stations is managed as the uplink management information (uplink management information). In this embodiment, it is assumed that the downlink allocation information includes whether or not wireless resources are allocated in advance by the scheduling processing for the downlink, which will be described later, and the elapsed time from the allocation.

FIG. 3 is a diagram showing, in the tabular format, the downlink information on the mobile stations managed by the mobile station information management unit 107. This table is different from the table shown in FIG. 11 in that the uplink allocation information on the mobile stations is managed as the management information on the downlink (downlink management information). In this embodiment, it is assumed that the uplink allocation information includes whether or not wireless resources are allocated in advance by the scheduling processing for the uplink, which will be described later, and the elapsed time from the allocation.

The scheduling processing unit (means for scheduling) 106 calculates the priority of each mobile station based on the information received from the mobile station information management unit 107 and selects a high priority mobile station. When selecting a mobile station, the scheduling processing unit 106 uses the mobile station selection algorithm that gives priority to a mobile station to which wireless resources are allocated in advance on the communication link in the direction opposite to the direction in which wireless resources are to be allocated. The scheduling processing unit 106 outputs the selection result to the data packet reception unit 105, signal transmission unit 110, and downlink transmission data generation unit 108. In addition, the scheduling processing unit 106 notifies the mobile station information management unit 107 of the allocation information on each mobile station selected as described above.

The signal transmission unit 110 transmits the uplink transmission permission notification signal and the packet data, generated by the downlink transmission data generation unit 108, to the selected mobile station.

The transmission packet data processing unit 109 outputs the presence or absence of transmission data (downlink data) and QoS of each mobile station to the mobile station information management unit 107 and, when downlink data is transmitted, outputs packet data to the downlink transmission data generation unit 108.

Next, the operation of this embodiment will be described in detail with reference to the drawings. First, the following describes the uplink and the downlink more in detail.

[Uplink]

In the description below, it is assumed that, for each mobile station, the mobile station information management unit 107 manages the presence or absence of an uplink transmission request, the uplink signal reception quality, the QoS information, and the downlink allocation information, as shown in the table in FIG. 2. As described above, the downlink allocation information includes whether or not wireless resources are allocated in advance by the downlink scheduling processing and the elapsed time from the allocation.

Figure 4:
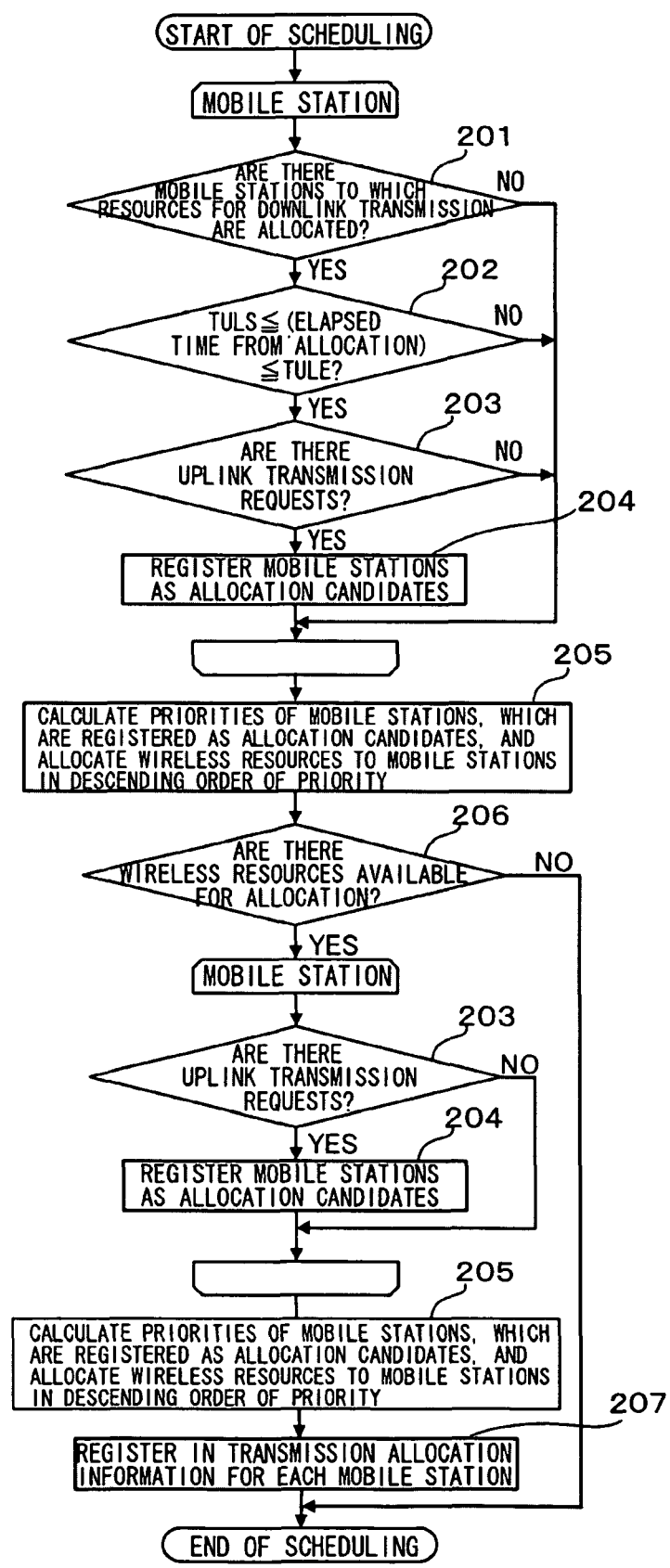
FIG. 4 is a flowchart showing the uplink scheduling processing in a base station of the wireless communication system in the first exemplary embodiment of the present invention.

FIG. 4 is a flowchart showing the uplink scheduling operation of the scheduling processing unit 106. In the description below, it is assumed that the downlink allocation processing is performed in advance for a mobile station for which uplink scheduling is to be performed.

Referring to FIG. 4, the scheduling processing unit 106 first extracts mobile stations, to which wireless resources are allocated in advance for downlink transmission, based on the information sent from the mobile station information management unit 107 (step 201).

Next, the scheduling processing unit 106 checks if the elapsed time from the allocation for downlink transmission of each extracted mobile station is in the pre-set time range (start point Tuls-end point Tule) (step 202). This time range (start point Tuls-end point Tule); which is set for a time during which a response to the transmission from the base station is estimated to be returned, is set in order to eliminate an unnecessary allocation. The actual value may be changed appropriately according to the system.

Figure 5:
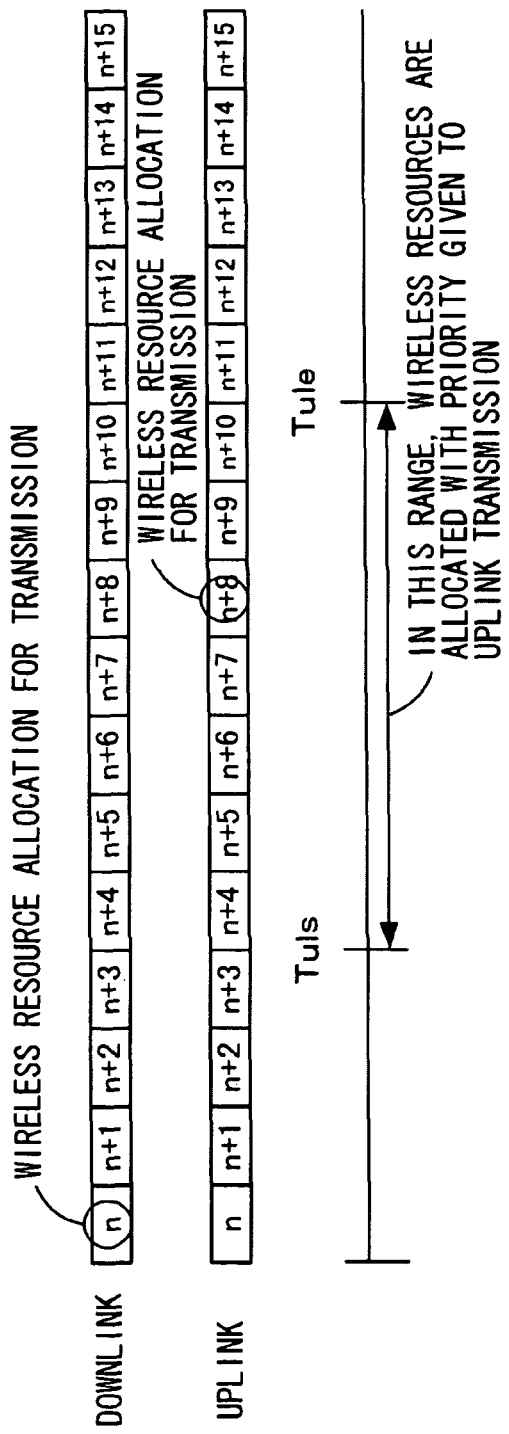
FIG. 5 is a diagram showing the concept of uplink scheduling based on the wireless resource allocation to downlink transmission and on the priority time range (start point Tulsend point Tule).

FIG. 5 is a diagram showing the concept of uplink scheduling based on the wireless resource allocation to downlink transmission and the time range described above (start point Tuls-end point Tule). FIG. 5 is a diagram showing an example in which wireless resources are allocated to a mobile station for uplink transmission in the above-described time range (start point Tuls-end point Tule) based on the time at which wireless resources are allocated to the mobile station for downlink transmission.

Next, the scheduling processing unit 106 extracts mobile stations that have an uplink transmission request (step 203).

The scheduling processing unit 106 registers the mobile stations, which satisfy all condition in steps 201-203, as allocation candidates (step 204).

Next, the scheduling processing unit 106 calculates the priorities of the mobile stations, registered as allocation candidates, and allocates uplink wireless resources to the mobile stations in descending order of priority (step 205).

For example, the priority calculation expression is given as follows.

$$\text{Priority of mobile station} = f(\text{uplink reception quality, uplink QoS})$$

Here, $f(\ )$ is a function based on a general scheduling method such as Max C/I (Carrier to Interference) method, Proportional Fairness method, and Round Robin method. In addition, the priority calculation may be changed in such a way that the priority is increased as the elapsed time from the allocation gets near the end point Tule of the pre-set time range (start point Tuls-end point Tule).

After allocating wireless resources to mobile stations which are to receive a response to a downlink transmission as described above, the scheduling processing unit 106 checks if there are still wireless resources available for allocation (step 206).

If there are still wireless resources available for allocation after the checking in step 206, the scheduling processing unit 106 performs scheduling for mobile stations that have an uplink transmission request (steps S203-205). The information on the mobile stations, to which wireless resources are allocated here, is registered in the mobile station information management unit 107 as information on the mobile stations for downlink transmission, which will be described below, to indicate that uplink transmission resources are allocated (step 207) (uplink allocation information included in the downlink management information in FIG. 3).

If there is no wireless resource available for allocation, the scheduling processing unit 106 does not perform the second scheduling processing but terminates the processing (No in step 206).

Note that, if the condition after the step for checking if wireless resources for downlink transmission are allocated (Yes in step 201) are satisfied and if wireless resources are allocated judging that the transmission is a connection type communication response, the uplink allocation information is not registered in the mobile station information management unit 107. This prevents prioritized scheduling processing from being continuously performed for a mobile station to which the wireless resources are allocated.

The scheduling processing unit 106 notifies the information on the mobile stations, to which wireless resources area allocated by the scheduling processing described above, to the signal transmission unit 110 as the uplink transmission permission notification. The signal transmission unit 110 generates the downlink transmission signal based on the notification and transmits the generated downlink transmission signal to the mobile station via the antenna unit 101.

[Downlink]

Next, the following describes the downlink scheduling processing.

In the description below, it is assumed that, for each mobile station, the mobile station information management unit 107 manages the presence or absence of downlink transmission data, the downlink signal reception quality, the QoS information, and the uplink allocation information, as shown in the table in FIG. 3. As described above, the uplink allocation information includes whether or not wireless resources are allocated in advance by the uplink scheduling processing and the elapsed time from the allocation.

Figure 6:
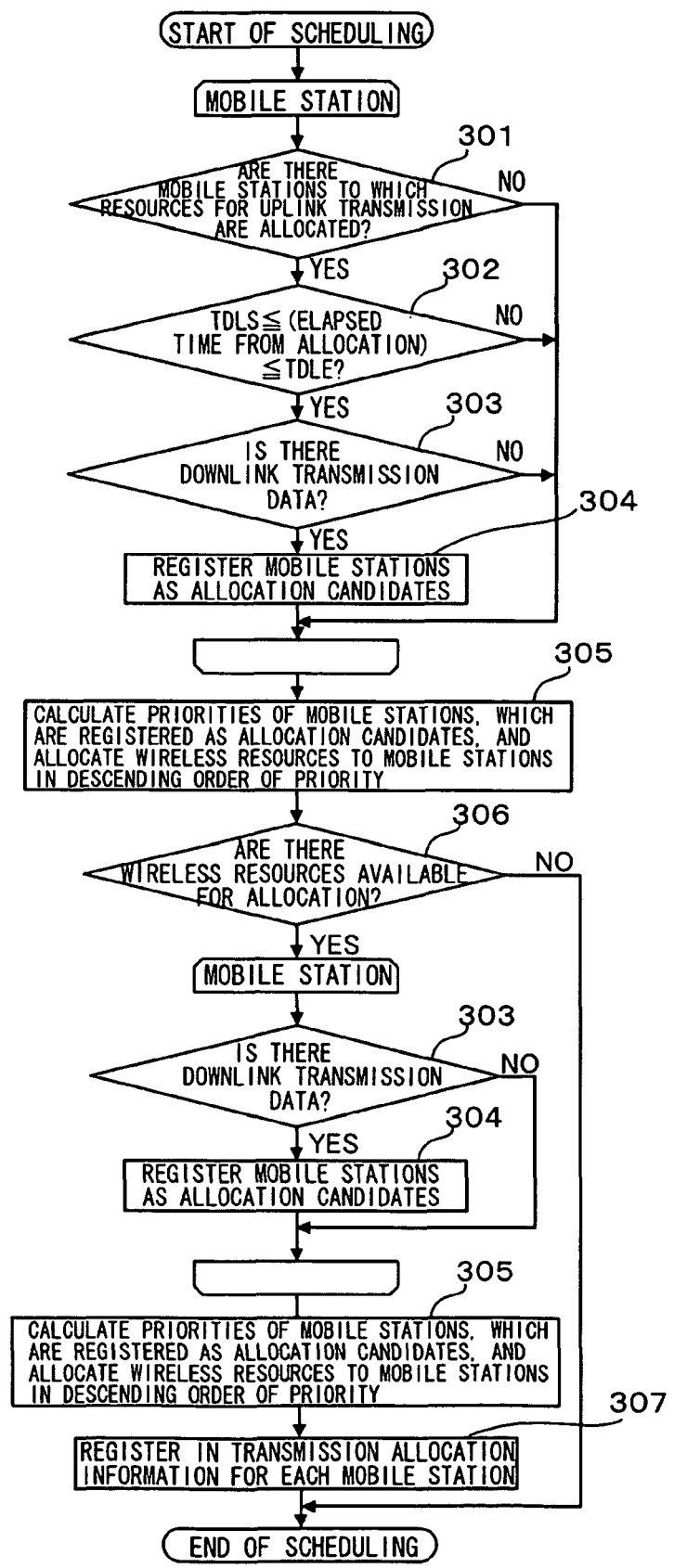
FIG. 6 is a flowchart showing the downlink scheduling processing in a base station of the wireless communication system in the first exemplary embodiment of the present invention.

FIG. 6 is a flowchart showing the downlink scheduling operation of the scheduling processing unit 106. In the description below, it is assumed that the uplink allocation processing described above is performed in advance for a mobile station for which downlink scheduling is to be performed.

Referring to FIG. 6, the scheduling processing unit 106 first extracts mobile stations, to which wireless resources are allocated in advance for uplink transmission, based on the information sent from the mobile station information management unit 107 (step 301).

Next, the scheduling processing unit 106 checks if the elapsed time from the allocation for uplink transmission of each extracted mobile station is in the pre-set time range (start point Tdls-end point Tdle) (step 302). This time range (start point Tdls-end point Tdle), which is set for a time during which a response to the transmission to the base station is estimated to be returned, is set in order to eliminate an unnecessary allocation. The actual value may be changed appropriately according to the system.

Figure 7:
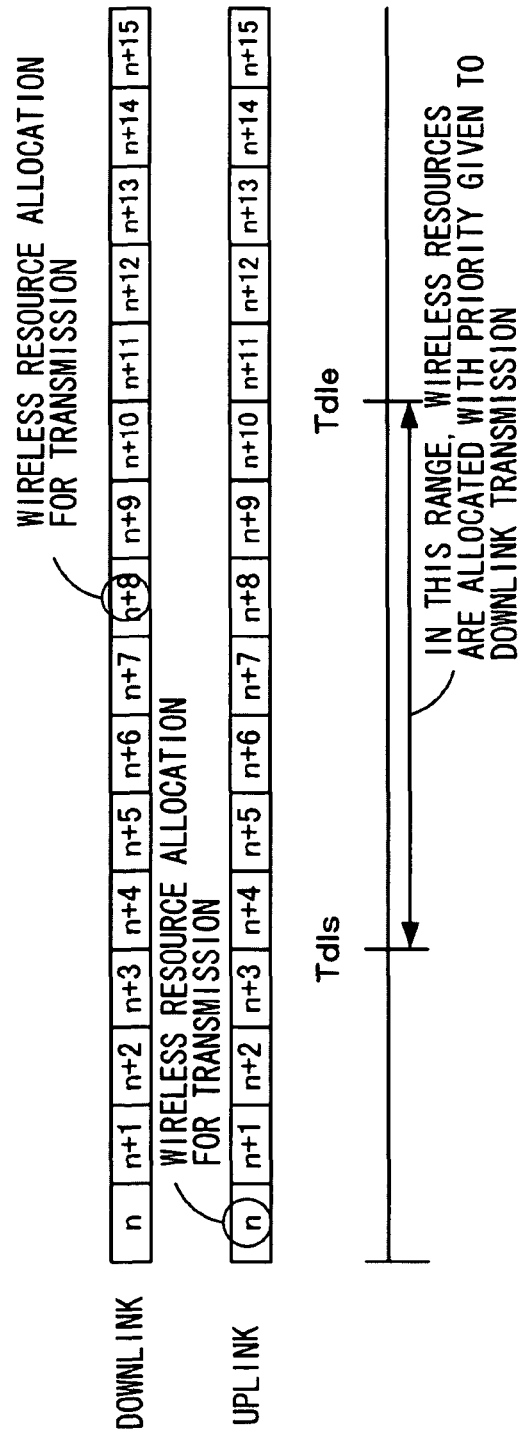
FIG. 7 is a diagram showing the concept of downlink scheduling based on the wireless resource allocation to uplink transmission and on the priority time range (start point Tdlsend point Tdle).

FIG. 7 is a diagram showing the concept of downlink scheduling based on the wireless resource allocation to uplink transmission and the time range described above (start point Tdls-end point Tdle). FIG. 7 is a diagram showing an example in which wireless resources are allocated to a mobile station for downlink transmission in the time range (start point Tdls-end point Tdle) based on the time at which wireless resources are allocated to the mobile station for uplink transmission.

Next, the scheduling processing unit 106 extracts mobile stations that have downlink transmission data (step 303).

The scheduling processing unit 106 registers the mobile stations, which satisfy all condition in steps 301-303, as allocation candidates (step 304).

Next, the scheduling processing unit 106 calculates the priorities of the mobile stations, registered as allocation candidates, and allocates downlink wireless resources to the mobile stations in descending order of priority (step 305).

An example of the priority calculation expression is as follows.

$$\text{Priority of mobile station} = f(\text{downlink reception quality, downlink QoS})$$

Here, f( ) is a function based on a general scheduling method such as Max C/I (Carrier to Interference) method, Proportional Fairness method, and Round Robin method. In addition, the priority calculation may be changed in such a way that the priority is increased as the elapsed time from the allocation gets near the end point Tdle of the pre-set time range (start point Tdls-end point Tdle).

After allocating wireless resources to mobile stations which are to receive a response to an uplink transmission as described above, the scheduling processing unit 106 checks if there are still wireless resources available for allocation (step 306).

If there are still wireless resources available for allocation after the checking in step 306, the scheduling processing unit 106 performs scheduling for mobile stations that have a downlink transmission request (steps S303-305). The information on the mobile stations, to which wireless resources are allocated here, is registered in the mobile station information management unit 107 as information on the mobile stations for uplink transmission, which was described above, to indicate that downlink transmission resources are allocated (step 307) (downlink allocation information included in the uplink management information in FIG. 2).

If there is no wireless resource available for allocation, the scheduling processing unit 106 does not perform the second scheduling processing but terminates the processing (No in step 306).

Note that, if the conditions after the step for checking if wireless resources for uplink transmission are allocated (Yes in step 301) are satisfied and if wireless resources are allocated judging that the transmission is a connection type communication response, the downlink allocation information is not registered in the mobile station information management unit 107. This prevents prioritized scheduling processing from being continuously performed for a mobile station to which the wireless resources are allocated.

The scheduling processing unit 106 notifies the information on the mobile stations, to which wireless resources area allocated by the scheduling processing described above, to the downlink transmission data generation unit 108 and the signal transmission unit 110. The downlink transmission data generation unit 108 receives the packet data corresponding to mobile stations, to which downlink wireless resources are allocated, from the transmission packet data processing unit 109, generates transmission packet data for each mobile station, and sends a notification to the signal transmission unit 110. The signal transmission unit 110 generates the downlink transmission signal based on the notification and transmits the generated downlink transmission signal to the mobile station via the antenna unit 101.

As described above, this embodiment improves a throughput decrease, caused by a delay in a response in communication where intercommunication is required, such as a TCP-based communication, in a wireless packet communication system.

Second Exemplary Embodiment

Next, the following describes a second embodiment of the present invention in detail with reference to the drawings. The basic configuration of the second embodiment of the present invention is the same as that of the first embodiment of the present invention and, so, the following describes the scheduling method that is different from that in the first embodiment.

[Uplink]

Figure 8:
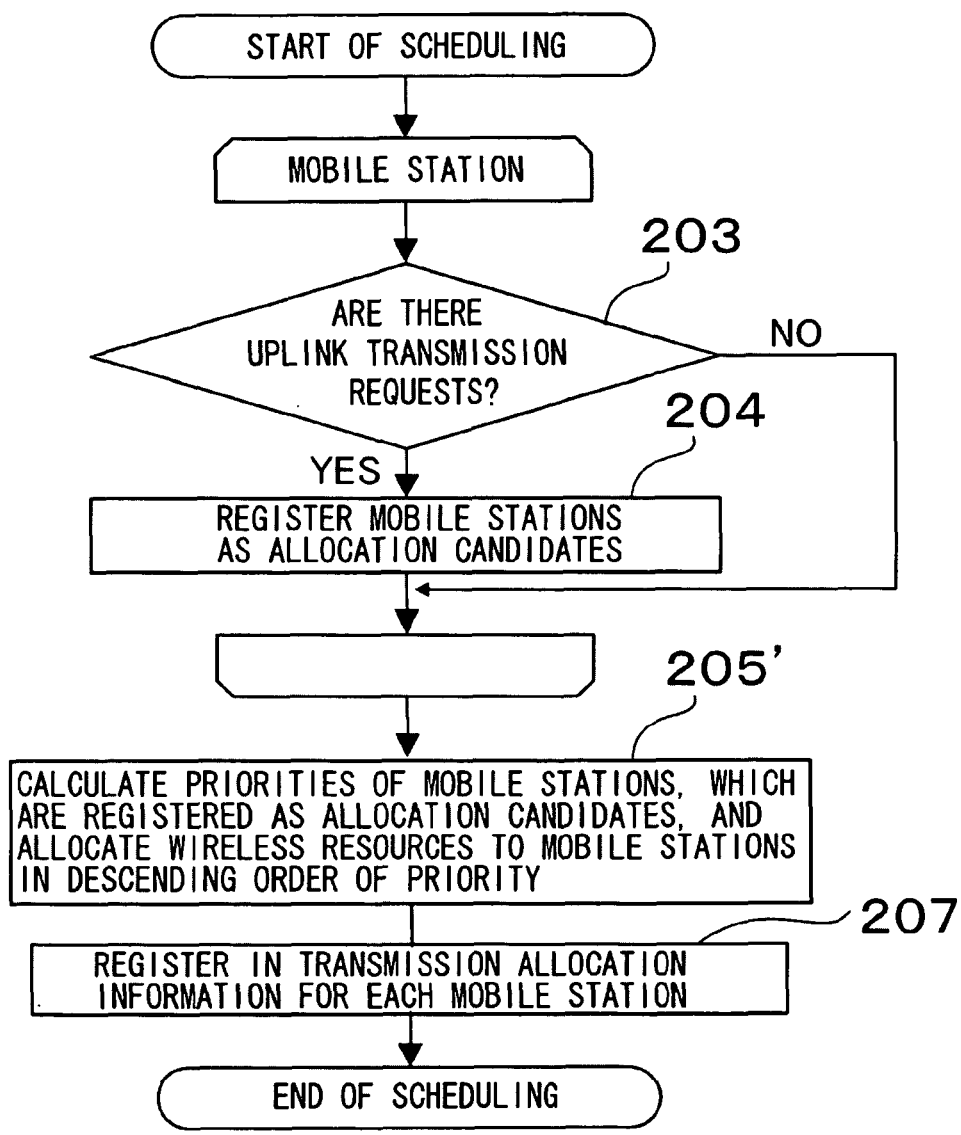
FIG. 8 is a flowchart showing the uplink scheduling processing in a base station of a wireless communication system in a second exemplary embodiment of the present invention.

FIG. 8 is a flowchart showing the uplink scheduling processing in a base station of a wireless communication system in the second embodiment of the present invention.

Referring to FIG. 8, a scheduling processing unit 106 first extracts mobile stations that have an uplink transmission request (step 203).

The scheduling processing unit 106 registers the extracted mobile stations as allocation candidates (step 204).

Next, the scheduling processing unit 106 calculates the priorities of the allocation candidate mobile stations and allocates uplink wireless resources to them in descending order of priority (step 205').

For example, the priority calculation expression in step 205' is given as follows.

Priority of mobile station=$f$(uplink reception quality, uplink QoS)+$\alpha \times DL\_Allocation$ Here, $f(\ )$ is a function based on a general scheduling method such as Max C/I (Carrier to Interference) method, Proportional Fairness method, and Round Robin method. $\alpha$ is a weighting factor for the downlink allocation information. DL_Allocation is 1 if wireless resources are allocated to downlink transmission, and 0 if not. As in the first embodiment described above, the allocation to downlink transmission (DL_Allocation=1) may be restricted to the case in which the elapsed time from the allocation is in the time range (start point Tuls-Tule). In this case, too, the priority calculation may be changed in such a way that the priority is increased as the elapsed time from the allocation gets near the end point Tule of the pre-set time range (start point Tuls-end point Tule).

The information on the mobile stations, to which wireless resources are allocated here, is registered in the mobile station information management unit 107 as information on the mobile stations for downlink transmission, which will be described below, to indicate that uplink transmission resources are allocated (step 207) (uplink allocation information included in the downlink management information in FIG. 3).

In this embodiment, calculating the priority as described above simplifies the scheduling processing.

[Downlink]

Figure 9:
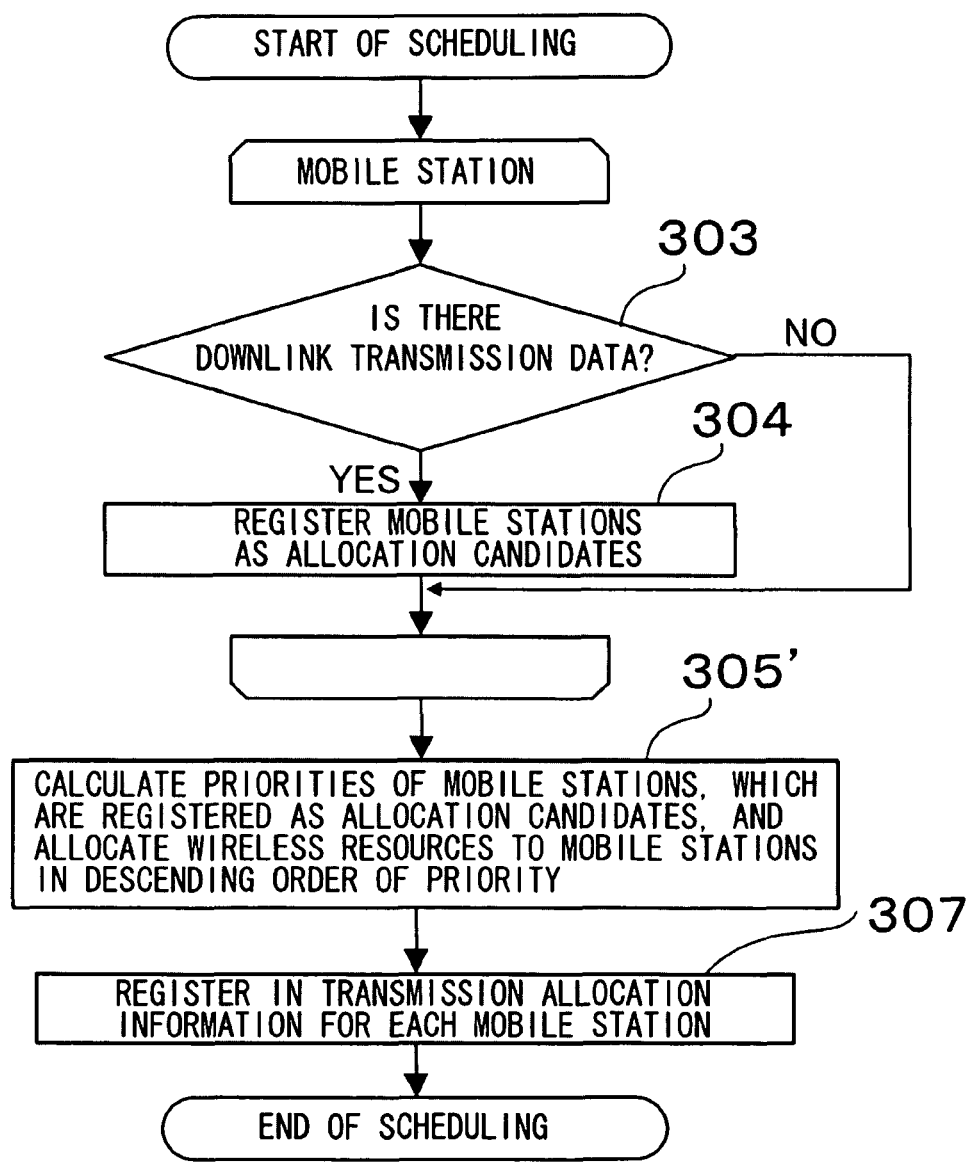
FIG. 9 is a flowchart showing the downlink scheduling processing in a base station of the wireless communication system in the second exemplary embodiment of the present invention.

FIG. 9 is a flowchart showing the downlink scheduling processing in a base station of a wireless communication system in the second embodiment of the present invention.

Referring to FIG. 9, the scheduling processing unit 106 first extracts mobile stations that have downlink transmission data (step 303).

The scheduling processing unit 106 registers the extracted mobile stations as allocation candidates (step 304).

Next, the scheduling processing unit 106 calculates the priorities of the allocation candidate mobile stations and allocates downlink wireless resources to them in descending order of priority (step 305').

For example, the priority calculation expression in step 305' is given as follows.

Priority of mobile station=$f$(downlink reception quality, downlink QoS)+$\beta \times UL\_Allocation$ Here, $f(\ )$ is a function based on a general scheduling method such as Max C/I (Carrier to Interference) method, Proportional Fairness method, and Round Robin method. $\beta$ is a weighting factor for the uplink allocation information. UL_Allocation is 1 if wireless resources are allocated to uplink transmission, and 0 if not. As in the first embodiment described above, the allocation to uplink transmission (UL_Allocation=1) may be restricted to the case in which the elapsed time from the allocation is in the time range (start point Tdls-Tdle). In this case, too, the priority calculation may be changed in such a way that the priority is increased as the elapsed time from the allocation gets near the end point Tdle of the pre-set time range (start point Tdls-end point Tdle).

The information on the mobile stations, to which wireless resources are allocated here, is registered in the mobile station information management unit 107 as information on the mobile stations for uplink transmission, which will be described below, to indicate that downlink transmission resources are allocated (step 307) (downlink allocation information included in the uplink management information in FIG. 2).

In this embodiment, calculating the priority as described above simplifies the scheduling processing.

While the preferred embodiments of the present invention have been described above, it is to be understood that the present invention is not limited to the above embodiments and that further modifications, replacements, and adjustments may be added within the scope of the basic technological concept of the present invention. For example, though applied to a wireless packet communication system in the above embodiments, the present invention may be applied also to a wireless communication system that provides services using a connection type communication protocol.

Although the priority is calculated based on the reception quality and QoS in the above embodiments, the priority calculation may be changed according to the priority method. Although the elapsed time from the allocation is managed in the above embodiments, it is also possible to use a method in which the allocation time n in FIG. 5 or FIG. 7 is retained for measuring the elapsed time.

Although the prioritized processing is not applied in the above embodiments when wireless resources are allocated to a response in a connection type communication, it is also possible to keep mobile station information, which indicates whether or not prioritized allocation is performed, in order to prevent prioritized allocation (prioritized processing) from being performed continuously.

Mode 1

In the following, preferred modes are summarized. (refer to the wireless communication system of the first aspect)

Mode 2

The wireless communication system as defined by mode 1 wherein, as prioritized processing for the mobile stations to which wireless resources are allocated on the opposite-direction communication link, scheduling is performed for the mobile stations to which wireless resources are allocated on the opposite-direction communication link.

Mode 3

The wireless communication system as defined by mode 1 or 2, wherein, as prioritized processing for the mobile stations to which wireless resources are allocated on the opposite-direction communication link, the wireless resource allocation priority of the mobile stations, to which wireless resources are allocated on the opposite-direction communication link, is corrected.

Mode 4

The wireless communication system as defined by one of modes 1-3, wherein a wireless resource allocation time is held in conjunction with the wireless resource allocation information on the opposite-direction communication link, and the prioritized processing is applied in a period during which an elapsed time from the allocation time is in a predetermined time range.

Mode 5

The wireless communication system as defined by mode 4 wherein the prioritized processing for the mobile stations, to which wireless resources are allocated on the opposite-direction communication link, is performed in such a way that a mobile station whose elapsed time from the allocation time is longer receives priority higher than priority of a mobile station whose elapsed time from the allocation time is shorter.

Mode 6

The wireless communication system as defined by one of modes 1-5 wherein the prioritized processing for the mobile stations, to which wireless resources are allocated on the opposite-direction communication link, is performed by calculating the wireless resource allocation priority of the mobile stations using a priority calculation expression that adds priority when wireless resources are allocated on the opposite-direction communication link.

Mode 7

The wireless communication system as defined by one of modes 1-6 wherein the prioritized processing is not applied when wireless resources are allocated to a response in a connection-type communication.

Mode 8

(refer to the base station of the second aspect)

Mode 9

The base station as defined by mode 8 wherein, as prioritized processing for the mobile stations to which wireless resources are allocated on the opposite-direction communication link, scheduling is performed for the mobile stations to which wireless resources are allocated on the opposite-direction communication link.

Mode 10

The base station as defined by mode 8 or 9 wherein, as prioritized processing for the mobile stations to which wireless resources are allocated on the opposite-direction communication link, the wireless resource allocation priority of the mobile stations, to which wireless resources are allocated on the opposite-direction communication link, is corrected.

Mode 11

The base station as defined by one of modes 8-10 wherein a wireless resource allocation time is held in conjunction with the wireless resource allocation information on the opposite-direction communication link and the prioritized processing is applied in a period during which an elapsed time from the allocation time is in a predetermined time range.

Mode 12

The base station as defined by mode 11 wherein the prioritized processing for the mobile stations, to which wireless resources are allocated on the opposite-direction communication link, is performed in such a way that a mobile station whose elapsed time from the allocation time is longer receives priority higher than priority of a mobile station whose elapsed time from the allocation time is shorter.

Mode 13

The base station as defined by one of modes 8-12 wherein the prioritized processing for the mobile stations, to which wireless resources are allocated on the opposite-direction communication link, is performed by calculating the wireless resource allocation priority of the mobile stations using a priority calculation expression that adds priority when wireless resources are allocated on the opposite-direction communication link.

Mode 14

The base station as defined by one of modes 8-13 wherein the prioritized processing is not applied when wireless resources are allocated to a response in a connection-type communication.

Mode 15

(refer to the scheduling method of the third aspect)

Mode 16

The scheduling method as defined by mode 15 wherein, as prioritized processing for the mobile stations to which wireless resources are allocated on the opposite-direction communication link, scheduling is performed for the mobile stations to which wireless resources are allocated on the opposite-direction communication link.

Mode 17

The scheduling method as defined by mode 15 or 16 wherein, as prioritized processing for the mobile stations to which wireless resources are allocated on the opposite-direction communication link, the wireless resource allocation priority of the mobile stations, to which wireless resources are allocated on the opposite-direction communication link, is corrected.

Mode 18

The scheduling method as defined by one of modes 15-17 wherein a wireless resource allocation time is held in conjunction with the wireless resource allocation information on the opposite-direction communication link and the prioritized processing is applied in a period during which an elapsed time from the allocation time is in a predetermined time range.

Mode 19

The scheduling method as defined by mode 18 wherein the prioritized processing for the mobile stations, to which wireless resources are allocated on the opposite-direction communication link, is performed in such a way that a mobile station whose elapsed time from the allocation time is longer receives priority higher than priority of a mobile station whose elapsed time from the allocation time is shorter.

Mode 20

The scheduling method as defined by one of modes 15-19 wherein the prioritized processing for the mobile stations, to which wireless resources are allocated on the opposite-direction communication link, is performed by calculating the wireless resource allocation priority of the mobile stations using a priority calculation expression that adds priority when wireless resources are allocated on the opposite-direction communication link.

Mode 21

The scheduling method as defined by one of modes 15-20 wherein the prioritized processing is not applied when wireless resources are allocated to a response in a connection-type communication.

Mode 22
(refer to the program of the fourth aspect)

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A wireless communication system comprising:
    a holding unit that holds at least wireless resource allocation information on a first-direction communication link for use as information for deciding priority of wireless resource allocation to mobile stations, said first-direction communication link being a communication link in a direction opposite to a second direction in which allocation priority is to be decided; and
    a scheduling unit that performs scheduling to allocate wireless resources with priority given to mobile stations, to which wireless resources are allocated on the first-direction communication link, using the wireless resource allocation information on the first-direction communication link,
    wherein the scheduling assigns priority to first-direction data to improve a characteristic of the first-direction data.

2. The wireless communication system as defined by claim 1 wherein, as prioritized processing for the mobile stations to which wireless resources are allocated on the first-direction communication link, scheduling is performed for the mobile stations to which wireless resources are allocated on the first-direction communication link.

3. The wireless communication system as defined by claim 1 wherein, as prioritized processing for the mobile stations to which wireless resources are allocated on the first-direction communication link, the wireless resource allocation priority of the mobile stations, to which wireless resources are allocated on the first-direction communication link, is modified.

4. The wireless communication system as defined by claim 1 wherein
    a wireless resource allocation time is held in conjunction with the wireless resource allocation information on the first-direction communication link, and
    the prioritized processing is applied in a period during which an elapsed time from the wireless resource allocation time is in a predetermined time range.

5. The wireless communication system as defined by claim 4 wherein the prioritized processing for the mobile stations, to which wireless resources are allocated on the first-direction communication link, is performed so a mobile station whose elapsed time from the wireless resource allocation time is longer receives priority higher than priority of a mobile station whose elapsed time from the wireless resource allocation time is shorter.

6. The wireless communication system as defined by claim 1 wherein the prioritized processing for the mobile stations, to which wireless resources are allocated on the first-direction communication link, is performed by calculating the wireless resource allocation priority of the mobile stations using a priority calculation expression that adds priority when wireless resources are allocated on the first-direction communication link.

7. The wireless communication system as defined by claim 1 wherein the prioritized processing is not applied when wireless resources are allocated to a response in a connection-type communication.

8. A base station comprising:
    a holding unit that holds at least wireless resource allocation information on a first-direction communication link for use as information for deciding priority of wireless resource allocation to mobile stations, said first-direction communication link being a communication link in a direction opposite to a second direction in which allocation priority is to be decided; and
    a scheduling unit that performs scheduling to allocate wireless resources with priority given to mobile stations, to which wireless resources are allocated on the first-direction communication link, using the wireless resource allocation information on the first-direction communication link,
    wherein the scheduling assigns priority to first-direction data to improve a characteristic of the first-direction data.

9. The base station as defined by claim 8 wherein, as prioritized processing for the mobile stations to which wireless resources are allocated on the first-direction communication link, scheduling is performed for the mobile stations to which wireless resources are allocated on the first-direction communication link.

10. The base station as defined by claim 8 wherein, as prioritized processing for the mobile stations to which wireless resources are allocated on the first-direction communication link, the wireless resource allocation priority of the mobile stations, to which wireless resources are allocated on the first-direction communication link, is modified.

11. The base station as defined by claim 8 wherein
    a wireless resource allocation time is held in conjunction with the wireless resource allocation information on the first-direction communication link and
    the prioritized processing is applied in a period during which an elapsed time from the wireless resource allocation time is in a predetermined time range.

12. The base station as defined by claim 11 wherein the prioritized processing for the mobile stations, to which wireless resources are allocated on the first-direction communication link, is performed so a mobile station whose elapsed time from the wireless resource allocation time is longer receives priority higher than priority of a mobile station whose elapsed time from the wireless resource allocation time is shorter.

13. The base station as defined by claim 8 wherein the prioritized processing for the mobile stations, to which wireless resources are allocated on the first-direction communication link, is performed by calculating the wireless resource allocation priority of the mobile stations using a priority calculation expression that adds priority when wireless resources are allocated on the first-direction communication link.

14. The base station as defined by claim 8 wherein the prioritized processing is not applied when wireless resources are allocated to a response in a connection-type communication.

15. A scheduling method comprising the steps of:
    holding at least wireless resource allocation information on a first-direction communication link for use as information for deciding priority of wireless resource allocation to mobile stations, said first-direction communication link being a communication link in a direction opposite to a second direction in which allocation priority is to be decided; and performing scheduling to allocate wireless resources with priority given to mobile stations, to which wireless resources are allocated on the first-direction communication link, using the wireless resource allocation information on the first-direction communication link, wherein the scheduling assigns priority to first-direction data to improve a characteristic of the first-direction data.

16. The scheduling method as defined by claim 15 wherein, as prioritized processing for the mobile stations to which wireless resources are allocated on the first-direction communication link, scheduling is performed for the mobile stations to which wireless resources are allocated on the first-direction communication link.

17. The scheduling method as defined by claim 15 wherein, as prioritized processing for the mobile stations to which wireless resources are allocated on the first-direction communication link, the wireless resource allocation priority of the mobile stations, to which wireless resources are allocated on the first-direction communication link, is modified.

18. The scheduling method as defined by claim 15 wherein a wireless resource allocation time is held in conjunction with the wireless resource allocation information on the first-direction communication link and the prioritized processing is applied in a period during which an elapsed time from the wireless resource allocation time is in a predetermined time range.

19. The scheduling method as defined by claim 18 wherein the prioritized processing for the mobile stations, to which wireless resources are allocated on the first-direction communication link, is performed so a mobile station whose elapsed time from the wireless resource allocation time is longer receives priority higher than priority of a mobile station whose elapsed time from the wireless resource allocation time is shorter.

20. The scheduling method as defined by claim 15 wherein the prioritized processing for the mobile stations, to which wireless resources are allocated on the first-direction communication link, is performed by calculating the wireless resource allocation priority of the mobile stations using a priority calculation expression that adds priority when wireless resources are allocated on the first-direction communication link.

* * * * *